(12) United States Patent
Ebert et al.

(10) Patent No.: US 8,857,543 B2
(45) Date of Patent: Oct. 14, 2014

(54) MOTOR VEHICLE

(75) Inventors: Andreas Ebert, Gärtringen (DE); Peter Gere, Owen (DE); Arnold Klimas, Boblingen (DE); Lena Krimstein, Stuttgart (DE); Van Dung Nguyen, Esslingen (DE); Werner Walter, Tamm (DE)

(73) Assignee: Daimler A.G., Stuttgart (DE)

( * ) Notice: Subject to any disclaimer, the term of this patent is extended or adjusted under 35 U.S.C. 154(b) by 1353 days.

(21) Appl. No.: 12/321,363

(22) Filed: Jan. 20, 2009

(65) Prior Publication Data

US 2009/0173564 A1    Jul. 9, 2009

Related U.S. Application Data

(63) Continuation-in-part of application No. PCT/EP2007/005802, filed on Jun. 29, 2007.

(30) Foreign Application Priority Data

Jul. 22, 2006    (DE) .......................... 10 2006 034 021

(51) Int. Cl.
| | |
|---|---|
| B60K 6/20 | (2007.10) |
| B60K 6/40 | (2007.10) |
| B60K 6/405 | (2007.10) |
| B60K 6/26 | (2007.10) |
| B60K 6/48 | (2007.10) |

(52) U.S. Cl.
CPC . B60K 6/405 (2013.01); B60K 6/26 (2013.01); Y02T 10/6221 (2013.01); B60K 6/48 (2013.01); B60K 2001/0013 (2013.01)
USPC ...... 180/65.21; 180/68.4; 180/68.5; 180/69.2

(58) Field of Classification Search
USPC ............................ 180/65.21, 68.4, 68.5, 69.2
See application file for complete search history.

(56) References Cited

U.S. PATENT DOCUMENTS

| | | | |
|---|---|---|---|
| 6,302,385 B1 * | 10/2001 | Summers et al. .......... | 267/140.3 |
| 6,828,755 B1 * | 12/2004 | Iverson et al. ................ | 320/104 |
| 7,032,699 B2 * | 4/2006 | Sakata et al. .................... | 180/247 |
| 2004/0200647 A1 | 10/2004 | Shingo et al. | |
| 2004/0211613 A1* | 10/2004 | Asao et al. ..................... | 180/291 |

FOREIGN PATENT DOCUMENTS

| | | |
|---|---|---|
| DE | 197 47 265 | 5/1999 |
| EP | 1 049 235 | 11/2000 |
| EP | 1 093 958 | 4/2001 |
| EP | 1 422 810 | 5/2004 |
| EP | 1 489 295 | 12/2004 |
| JP | 2002187435 | 7/2002 |
| JP | 2004306848 | 11/2004 |
| JP | 2004328870 | 11/2004 |
| JP | 2005032830 | 2/2005 |
| JP | 2007269097 A * | 10/2007 |

* cited by examiner

Primary Examiner — J. Allen Shriver, II
Assistant Examiner — Bryan Evans
(74) Attorney, Agent, or Firm — Klaus J. Bach

(57) ABSTRACT

In a motor vehicle having an internal combustion engine disposed in an engine compartment provided with a hood, and also an electrical machine for at least assisting in driving the vehicle and generating electric energy, and a power electronics system for controlling the electric power supply to, and from the electric machine during operation of the motor vehicle by the internal combustion engine and/or the electrical machine, the power electronics system is arranged in the engine compartment above the internal combustion engine and below the hood.

18 Claims, 3 Drawing Sheets

MOTOR VEHICLE

This is a Continuation-In-Part Application of pending international patent application PCT/EP2007/005802 filed Jun. 29, 2007 and claiming the priority of German patent application 10 2006 034 021.3 filed Jul. 22, 2006.

BACKGROUND OF THE INVENTION

The invention relates to a motor vehicle including an internal combustion engine and an electric machine for driving the motor vehicle by at least one of the internal combustion engine and the electric machine, and a power electronic system for controlling the power supplied to, or by, the electric machine.

Vehicles having an internal combustion engine and an electrical machine, by which the vehicle can be driven, have a power electronics system for converting and switching electrical energy and for controlling the operation of the electrical machine. In this case, the electrical energy is provided in the form of high electric currents at high voltages. The power electronics system primarily permits electrical energy of a specific voltage and frequency to be converted into electrical energy of another voltage and/or frequency.

Generally, a battery is used as an electrical energy storage means and a three-phase electric machine is used as the electrical machine. The power electronics system serves to convert the DC voltage of the battery into a three-phase AC voltage for the motor mode of the three-phase machine and to convert the three-phase AC voltage into a DC voltage in the generator mode of operation of the three-phase machine.

In known vehicles, the power electronics system is arranged in the vicinity of the electrical machine, in order to keep the length of the AC voltage cabling short, and thus to keep, for example, the possible voltage drop in the AC voltage cabling low. If the electrical machine is integrated in the vehicle transmission, the power electronics system is attached to the transmission housing.

An arrangement of this type in a hybrid vehicle is known, for example, from DE 197 47 265 A1.

Further elements of the power electronics system, for example inverter units for auxiliary assemblies such as DC actuator units or control units, are arranged in known vehicles distributed over the vehicle in available smaller installation spaces. Disadvantageously long electrical cabling is required for this purpose, however.

It is the object of the present invention is to provide an alternative arrangement of the power electronics system, which makes the best possible use of the available installation space.

SUMMARY OF THE INVENTION

In a motor vehicle having an internal combustion engine disposed in an engine compartment provided with a hood, and also an electrical machine for at least assisting in driving the vehicle and generating electric energy, and a power electronics system for controlling the electric power supply to, and from the electric machine during operation of the motor vehicle by the internal combustion engine and/or the electrical machine, the power electronics system is arranged in the engine compartment above the internal combustion engine and below the hood.

This arrangement has the advantage that the installation space available in the transmission tunnel can be used in an optimum fashion for the electrical machine and/or the transmission housing. Therefore, the diameter of the electrical machine can be increased for a given installation space and consequently the power of the electrical machine can also be increased. An arrangement of the electronic system above the internal combustion engine likewise also has the advantage that, on account of the large horizontal surface available, a plurality of elements of the power electronics system can be combined and arranged there. The result of this is advantageously short electrical cabling.

In this case, the power electronics system is preferably arranged vertically above the internal combustion engine given horizontal orientation of the vehicle. The internal combustion engine and the power electronics system are therefore arranged in such a way that their projected horizontal surfaces overlap in the vertical direction.

The elements of the power electronics system are advantageously arranged within a housing which is at a small distance from the engine hood. This minimum distance is required in order to provide for the required pedestrian protection. In this case, the housing preferably has a shape which is matched to the shape of the engine hood so as to make good use of the available installation space.

The arrangement within a housing additionally has the advantage that protective measures required on account of the electric voltage present at the components enclosed in the housing can be established more easily and cost-effectively.

For the purpose of advantageous production and/or mounting of the housing, said housing may have a plurality of parts.

Because of the high temperatures above the internal combustion engine, a cooling unit for cooling the power electronics system is advantageously arranged within the housing.

In order to prevent vibrations of the internal combustion engine or of the drive train from being transmitted to the power electronics system, the housing is advantageously arranged such that it is fixed to the vehicle body. The housing is therefore mechanically connected to the body of the vehicle. A mechanical connection to the right-hand and left-hand spring strut dome and/or to the radiator cross-member of the vehicle is advantageous in this case. Preferably, the connections to the vehicle body are provided with vibration decoupling means.

The invention will become more readily apparent from the following description of particular exemplary embodiments of the invention with reference to accompanying drawings:

DESCRIPTION OF A PARTICULAR EMBODIMENT

Figure 1:
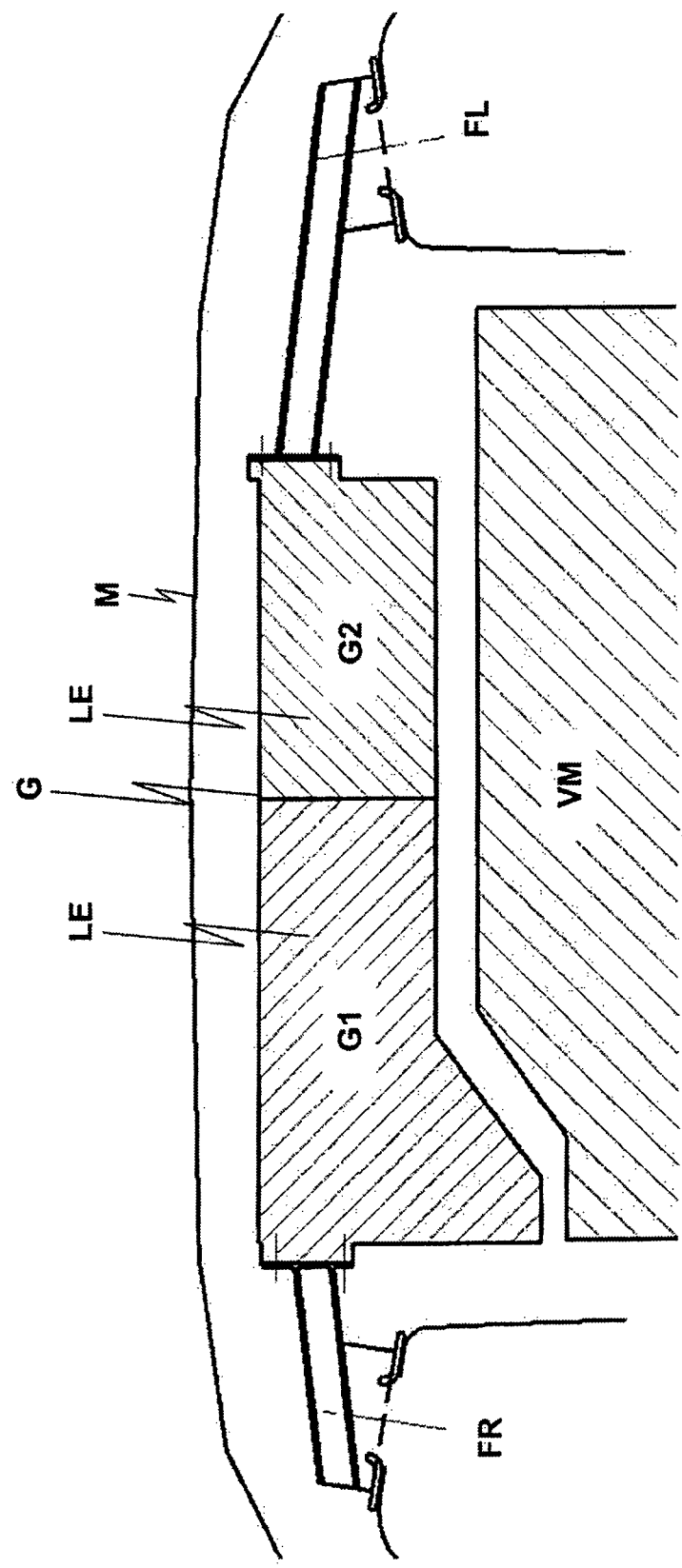
FIG. 1 shows in a schematic cross-sectional illustration the arrangement of a power electronic system on top of a motor vehicle engine.

FIG. 1 shows schematically a front cross sectional view of a first embodiment of a motor vehicle according to the invention having an internal combustion engine VM, an electrical machine (not illustrated) and a power electronics system LE which is arranged in a housing G comprising of two housing parts G1 and G2. The power electronics system LE is arranged above the internal combustion engine VM, in particular it is arranged in such a way that horizontal surfaces of the power electronics system LE and of the internal combustion engine VM overlap in the vertical direction. An arrangement in which the projected horizontal surfaces overlap only to a lesser extent or do not overlap at all, if this is permitted by the available installation space, is likewise possible. The housing G is at a small distance from the engine hood M. This distance is required to provide for the required pedestrian protection in case of an accident. The housing G is shaped in relation to the engine hood M and the internal combustion engine VM in such a way that the best possible use is made of the available installation space above the engine VM and, respectively, below the hood M.

Figure 2:
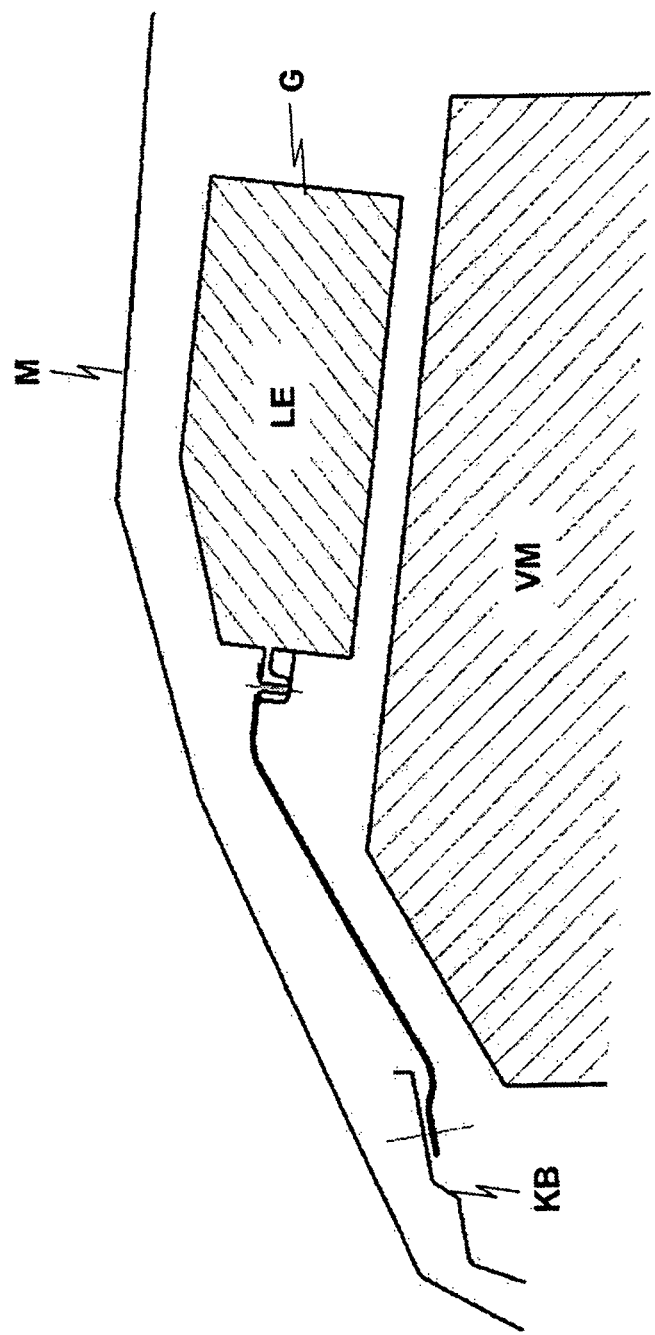
FIG. 2 shows the arrangement in a longitudinal sectional view a motor vehicle engine.

The housing G illustrated in FIG. 1 is connected to the right-hand and left-hand spring strut domes FR, FL via mechanical connections. Further connections to the vehicle body, in particular to the radiator crossmember KB as illustrated in FIG. 2, are possible in order to compensate for, in particular, forces in the longitudinal direction of the vehicle. In order to suppress or decouple vibrations, the mechanical connections themselves and/or the contact points to the housing G and/or to the vehicle body can have corresponding known damping means.

In the case of the longitudinal section, which is illustrated in FIG. 2, through a further refinement of a motor vehicle according to the invention, the power electronics system LE is likewise arranged within a housing G which is located above the internal combustion engine VM and is at a minimum distance from the engine hood M. Whereas FIG. 1 indicates matching of the shape of the housing G to the internal combustion engine VM, FIG. 2 shows matching of the shape of said housing G to the engine hood M. Of course, a combination of the two is possible. The housing G has a mechanical connection to the radiator cross-member KB which is arranged above the radiator grille in the transverse direction of the vehicle and constitutes a part of the vehicle body which accommodates, for example, the engine hood locking system. If space is available, a mechanical connection may extend directly to the radiator cross-member KB. This is particularly advantageous, but the housing G can also be connected to other points of the vehicle body. As explained in relation to FIG. 1, the mechanical connection particularly advantageously has means for suppressing vibrations. Said vibrations may be vibrations which are generated by the internal combustion engine VM or the drive train and could damage the power electronics system LE or the electrical cabling. However, said vibrations may also be, in particular high-frequency, vibrations which are generated by the power electronics system LE and could have a negative effect on other elements. By being passed on to the vehicle body, they could negatively affect the comfort of the occupants of the vehicle.

Figure 3:
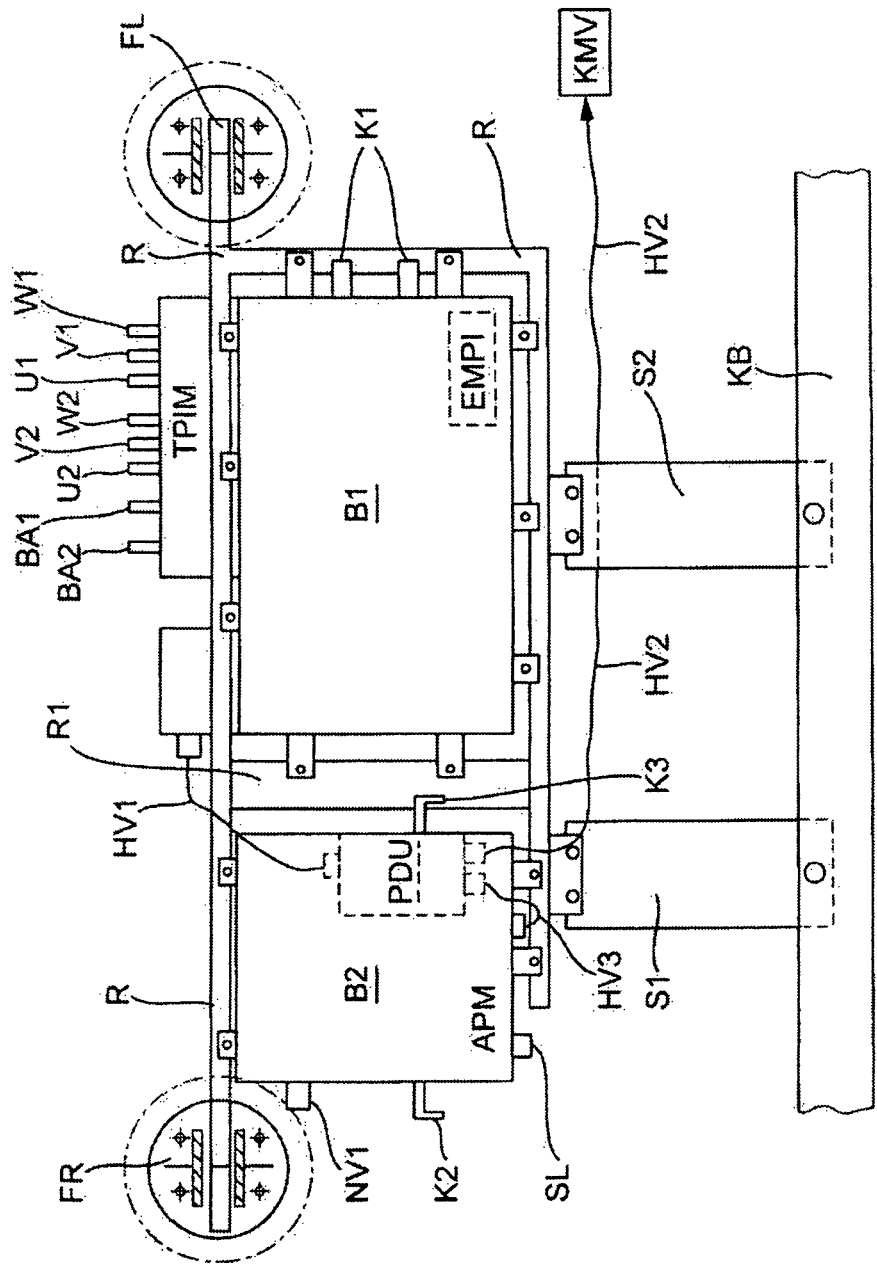
FIG. 3 shows schematically a power electronic system without a housing.

FIG. 3 shows a further embodiment of a vehicle according to the invention with a frame structure R, R1 for attaching the elements of the power electronics system LE which can be surrounded by a housing G (not illustrated).

In this exemplary embodiment, the frame R is mechanically connected to the right-hand and left-hand spring strut domes FR, FL. For the purpose of mechanical connection to the radiator cross member KB, FIG. 3 illustrates two bars, S1, S2 which are mechanically connected to the frame R. These mechanical connections are preferably decoupled from vibrations.

The power electronics system LE according to FIG. 3 has two structural units B1, B2, and the frame R includes a cross-member R1 for attaching the structural units B1, B2. These structural units B1, B2 would be respectively arranged in the housing parts G1, G2, as illustrated in FIG. 1, if the housing G were of two-part design (see FIG. 1).

The structural unit B1 of the power electronics system LE according to the exemplary embodiment according to FIG. 3 includes an inverter unit TPIM which converts the DC voltage of an energy storage means into an AC voltage for an electrical machine, and vice versa. The connections U1, V1, W1 which are connected to a first electrical machine which is a three-phase machine, and the connections U2, V2, W2, which are connected to a second electrical machine, are illustrated by way of example. The connections BA1, BA2 are connected to a high-voltage battery.

High voltages are voltages of above 100 V, in particular of around 300 V rated voltage, whereas a low voltage is a voltage of approximately 12 to 15 V.

Furthermore, the structural unit B1 has a high-voltage electrical connection HV1 to the structural unit B2, more precisely to a power distribution unit PDU which is contained in the structural unit B2.

The structural unit B1 likewise comprises a cooling unit for cooling the power electronics system LE of the structural unit B1. Corresponding connections to a cooling circuit are denoted K1 in FIG. 3.

The structural unit B1 of the power electronics system LE could likewise comprise a second inverter unit EMPI which converts the DC voltage of the high-voltage battery into an AC voltage for driving an additional assembly, in particular a transmission oil pump.

Control units which are associated with the inverter units TPIM, EMPI are not illustrated in FIG. 3. Such control units are preferably integrated in the structural unit B1.

The second structural unit B2 comprises the power distribution unit PDU and a DC actuator unit APM with a low-voltage output NV1 which is connected to a low-voltage battery or directly to electrical loads.

The power distribution unit PDU is connected to a refrigerant compressor KMV of the air-conditioning system of the vehicle via a high-voltage line HV2, said refrigerant compressor representing, by way of example, a further electrical load. The power distribution unit PDU is likewise connected to the DC actuator unit APM via a further high-voltage line HV3. A control unit which is associated with the DC actuator unit APM and is preferably integrated in the structural unit B2 is not illustrated. However, the control system of the DC actuator unit APM is indicated by a connection SL for a signal line.

In order to cool the structural unit B2, said structural unit likewise has a cooling unit whose connections are denoted K2 and K3. These connections can be connected to a separate cooling circuit or to the cooling unit of the structural unit B1.

It is indicated by the dashed lines, that the power distribution unit PDU could be a separate structural unit which would then be arranged in a third part of the housing G (not illustrated).

Cooling of the third structural unit would be implemented in a manner corresponding to that of the structural units B1, B2.

Other physical grouping arrangements of structural units are likewise possible.

What is claimed is:

1. A motor vehicle having a drive unit with an internal combustion engine (VM), disposed in an engine compartment provided with a hood (M) and an electrical machine for at least assisting in driving the vehicle and for generating electric energy, and a power electronics system (LE) for operating the motor vehicle by at least one of the internal combustion engine (VM) and the electrical machine by controlling the electric power supplied to, and by, the electric machine during operation of the motor vehicle by the internal combustion engine and the electrical machine, the power electronics system (LE) being arranged in the engine compartment above the internal combustion engine (VM) and below the hood (M), within a housing (G) which is disposed above the engine at a minimum distance from the engine compartment hood (M), the housing (G) being mechanically connected to, and supported by, body parts of the motor vehicle.

2. The motor vehicle as claimed in claim 1, wherein horizontal parts of the power electronics system (LE) extend at least partially over the internal combustion engine (VM) so as to be arranged overlapping the engine in the vertical direction.

3. The motor vehicle as claimed in claim 1, wherein the housing (G) has two parts (G1, G2).

4. The motor vehicle as claimed in claim 3, wherein the housing (G) has a third part.

5. The motor vehicle as claimed in claim 1, wherein a cooling unit for cooling the power electronics system (LE) is arranged within the housing (G).

6. The motor vehicle as claimed in claim 1, wherein the housing (G) is mechanically connected to right-hand and left-hand spring strut domes (FR, FL) of the motor vehicle.

7. The motor vehicle as claimed in claim 1, wherein the housing (G) is mechanically connected to a radiator cross-member (KB) of the motor vehicle.

8. The motor vehicle as claimed in claim 1, wherein the connections to the body parts of the motor vehicle are decoupled with respect to vibrations.

9. The motor vehicle as claimed in claim 1, wherein the power electronics system (LE) comprises a power distribution unit (PDU) having a high-voltage input (HV1) from an energy source and at least one high-voltage output (HV2) to an electrical load.

10. The motor vehicle as claimed in claim 1, wherein the power electronics system (LE) comprises an inverter unit (TPIM) which converts the DC voltage of an energy storage means into an AC voltage for the electrical machine, and vice versa.

11. The motor vehicle as claimed in claim 10, wherein the power electronics system (LE) comprises a first control unit which is associated with the inverter unit (TPIM).

12. The motor vehicle as claimed in claim 1, wherein the power electronics system (LE) comprises a DC actuator unit (APM) with a low-voltage output (NV1).

13. The motor vehicle as claimed in claim 11, wherein the power electronics system (LE) comprises a second inverter unit (EMPI) which converts the DC voltage of an energy storage means into an AC voltage for an additional assembly.

14. The motor vehicle as claimed in claim 13, wherein the additional assembly is a transmission oil pump.

15. The motor vehicle as claimed in claim 13, wherein the power electronics system (LE) comprises a second control unit which is associated with at least one of the DC actuator unit (APM) and the second inverter unit (EMPI).

16. A motor vehicle having a drive unit with an internal combustion engine (VM) disposed in an engine compartment provided with a hood (M) and an electric machine for at least assisting in driving the vehicle and for generating electric energy, and a power electronics system (LE) for operating the motor vehicle by at least one of the internal combustion engine (VM) and the electric machine by controlling the electric power supplied to, and by, the electric machine during operating of the motor vehicle by the internal combustion engine and the electric machine, the power electronics system (LE) being arranged in the engine compartment above the internal combustion engine (VM) and below the hood (M) and comprising a power distribution unit (PDU) a first inverter unit TPIM, a first control unit and at least first and second housing parts (G1, G2), the inverter unit (TPIM) and the first control unit being arranged within the first housing part (G1), and a DC actuator unit (APM), a second inverter unit (EMPI) and a second control unit being arranged within the second housing part (G2).

17. The motor vehicle as claimed in claim 16, wherein a cooling unit for cooling the power electronics system (LE) is arranged within one part (G1, G2, G3) of the housing (G), it being possible to connect said cooling unit to a cooling unit which is arranged within another part (G1, G2, G3) of the housing (G).

18. The motor vehicle as claimed in claim 16, wherein the inverter unit (TPIM) and the first control unit and also the second inverter unit (EMPI) and the second control unit are arranged within the first part (G1), the DC actuator unit (APM) is arranged within the second part (G2), and the power distribution unit (PDU) is arranged within a third part (G3) of the housing (G).

* * * * *